United States Patent [19]

Davis

[11] Patent Number: 5,819,109
[45] Date of Patent: Oct. 6, 1998

[54] SYSTEM FOR STORING PENDING PARITY UPDATE LOG ENTRIES, CALCULATING NEW PARITY, UPDATING THE PARITY BLOCK, AND REMOVING EACH ENTRY FROM THE LOG WHEN UPDATE IS COMPLETE

[75] Inventor: Scott H. Davis, Merrimack, N.H.

[73] Assignee: Digital Equipment Corporation, Maynard, Mass.

[21] Appl. No.: 987,116

[22] Filed: Dec. 7, 1992

[51] Int. Cl.$^6$ .................. G06F 7/00; G06F 7/16
[52] U.S. Cl. .......... 395/835; 395/839; 395/441; 371/49.2
[58] Field of Search .................. 395/275, 575, 395/821, 835, 839, 441; 371/49.2

[56] References Cited

U.S. PATENT DOCUMENTS

| | | | |
|---|---|---|---|
| 4,092,732 | 5/1978 | Ouchi | 364/900 |
| 4,434,487 | 2/1984 | Rubinson et al. | 371/10 |
| 4,608,661 | 8/1986 | Sasaki | 364/900 |
| 4,775,978 | 10/1988 | Hartness | 371/38 |
| 4,914,656 | 4/1990 | Dunphy, Jr. et al. | 371/10.2 |
| 4,953,122 | 8/1990 | Williams | 364/900 |
| 4,989,205 | 1/1991 | Dunphy et al. | 371/10.1 |
| 4,989,206 | 1/1991 | Dunphy et al. . | |
| 5,072,378 | 12/1991 | Manka | 395/575 |
| 5,208,813 | 5/1993 | Stallmo | 371/10.1 |
| 5,257,391 | 10/1993 | Dulae et al. | 395/800 |
| 5,263,145 | 11/1993 | Brady et al. | 395/425 |
| 5,375,128 | 12/1994 | Menon et al. | 371/40.1 |
| 5,390,302 | 2/1995 | Johnson et al. | 395/325 |

OTHER PUBLICATIONS

*A Case for Redundant Array of Inexpensive Disks (RAID),* David A. Patterson, Garth Gibson, Randy H. Katz, Report No. UCB/CSD 87/391, Dec., 1987, Computer Science Division (EECS), University of California, Berkeley, CA 94720.

*A Case for Redundant Arrays of Inexpensive Disks (RAID),* David A. Patterson, Garth Gibson, and Randy H. Katz, ACM Sigmod Conference—Jun. 1–3, 1988, Chicago, Illinois.

(List continued on next page.)

Primary Examiner—Thomas C. Lee
Assistant Examiner—Rehana P. Krick
Attorney, Agent, or Firm—Arthur W. Fisher; Ronald C. Hudgens

[57] ABSTRACT

The present invention is a method of writing data to a storage system using a redundant array of independent/inexpensive disks ("RAID") organization that eliminates the write hole problem of regenerating undetected corrupt data. The invention also overcomes the need for system overhead to synchronize data writes to logical block numbers that map to the same parity block. A log is constructed and used for storing information relating to requested updates or write operations to the data blocks in the multiple disk array. A separate entry is made in the log for each parity block that must be updated as a result of the write operation. Each log entry contains the addresses of the logical block numbers to which data must be written for that operation. After the new data is written to data blocks in the RAID array, a background scrubber operation sequentially reads the next available entry in the log and performs a parity calculation to determine the parity resulting from the write operation. The new parity information is written to the corresponding parity block and the log entry is deleted by the scrubber operation to indicate that the parity block corresponds to the data it represents. In addition, if a system failure occurs during a data write or after the data write but before the associated parity block is written, the original data can be accurately reconstructed using the remaining data blocks and the original parity information that remains in the parity block.

12 Claims, 4 Drawing Sheets

OTHER PUBLICATIONS

*Two Papers on RAIDs*, Peter Chen, Garth Gibson, Randy H. Katz, David A. Patterson, Martin Schulze, Report No. UCB/CSD 88/479, Dec., 1988, Computer Science Division (EECS), University of California, Berkeley, CA 94720.

*An Introduction to RAID—Redundant Arrays of Inexpensive Disks*, Peter McLean, Apr. 24, 1991, Digital Equipment Corporation—CX01-2/N26.

*Software and Performance Issues in the Implementation of a RAID Prototype*, Edward K. Lee, Report No. UCB/CSD 90/573, May 1990, Computer Science Division (EECS), University of California, Berkeley, CA 94720.

*A Queuing Analysis of RAID Architectures*, Schenze Chen and Don Towsley, COINS Tech. Report 91–71, Department of Computer and Information Science, University of Massachusetts, Amherst, MA 01003.

*The Digital Guide to RAID Storage Technology*, 1992, Digital Equipment Corporation.

SYSTEM FOR STORING PENDING PARITY UPDATE LOG ENTRIES, CALCULATING NEW PARITY, UPDATING THE PARITY BLOCK, AND REMOVING EACH ENTRY FROM THE LOG WHEN UPDATE IS COMPLETE

FIELD OF THE INVENTION

The present invention relates generally to methods for writing information on mass storage media. More particularly, the present invention relates to a method for writing information to a plurality of disks each connected to a separate drive and configured as a redundant array of independent/inexpensive disks ("RAID").

BACKGROUND OF THE INVENTION

The RAID methodology for storing information on disks is growing in popularity. In a data storage system using RAID technology, conventional assemblies for holding disk drives house either a single or multiple disks. All implementations of RAID make the configuration of multiple disks appear as a single virtual disk to is the user, achieving many desirable goals. One specific advantage provided by many types of RAID systems is improved data availability because parity data is employed to provide redundant storage capacity in the event that one disk or disk drive becomes inoperable or otherwise requires service. The parity information together with the other data that was used to form the parity is used to regenerate the data stored on a disk that is temporarily inoperative or that has failed using the standard RAID algorithms. RAID provides inexpensive data storage capability in comparison to other storage methods, such as volume shadowing.

Despite its inherent advantages, the basic operation of a data storage system using the RAID organization results in two specific problems. The first problem relates to the mapping of logical block numbers ("LBNs"). As will be appreciated by those of ordinary skill in the field, it is not generally efficient to store information on disks in contiguous physical blocks. As a result, virtual file systems are used to provide orderly mapping of stored information. By assigning sequential logical block numbers to files, these files may be addressed as though they occupied contiguous space on the disk. If multiple, unrelated LBNs are mapped so that the data stored therein is associated with the same parity block, simultaneous write operations to these otherwise unrelated LBNs must be prevented to ensure that the read-modify-write operations on the parity block do not corrupt each other. Substantial system overhead is expended to accomplish this synchronization in known RAID systems.

The second problem relates to a failure of the system during a RAID write operation. As used herein, the term "system failure" is used to denote a failure of the host computer associated with the RAID array or the RAID array itself during a write operation. As will be readily apparent to the skilled in the art, the parity scheme of RAID requires two separate write operations to ensure consistency between data and parity. That is, data and parity blocks are written in separate write operations. Inconsistency between data and parity results from a failure that causes only one write operation (either to the data block or the parity block) to be completed. In such a situation, if a subsequent failure occurs in another disk in the array, the data regenerated using the standard RAID algorithms will not correspond to the unavailable data because of the inconsistency caused by the prior failure. Therefore, the regenerated data that is written to replace the unavailable data or supplied to the user is corrupt, and there is no indication that corruption of the data has occurred. This phenomenon is commonly known as a "write hole" failure.

The majority of data storage systems using a RAID organization entirely ignore the write-hole problem. All known conventional data storage systems using a RAID organization require synchronization or serialization of parity access to prevent corruption from simultaneous parity writes to the same LBN. In other words, no currently available data storage system using a RAID organization adequately addresses both of the previously noted shortcomings. Accordingly, an improved method of performing write operations to a RAID array that preserves data integrity by eliminating the problem of regenerating undetected corrupt data and, particularly in cluster systems that allow data access by multiple CPUs, eliminating system overhead needed to lock out simultaneous data writes to LBNs that map to the same parity block is desirable.

SUMMARY OF THE INVENTION

The present invention is a method of writing data to a storage system using a RAID organization that eliminates the write hole problem of regenerating undetected corrupt data. Additionally, the invention overcomes the need for system overhead to synchronize data writes to LBNs that map to the same parity block. A log is constructed and used for storing information relating to requested updates or write operations to the data blocks in the multiple disk array. A separate entry is made in the log for each parity block that must be updated as a result of the write operation. Each log entry contains the addresses of the LBNs to which data must be written for that operation. After the new data is written to data blocks in the RAID array, a background scrubber operation is initiated.

The scrubber operation sequentially reads the next available entry in the log and performs a parity calculation to determine the parity resulting from the write operation. Next, the new parity information is written to the corresponding parity block. Finally, the log entry is deleted by the scrubber operation to indicate that the parity block corresponds to the data blocks it represents.

If, during a subsequent read operation to the RAID array, the block sought to be read is unavailable, the unavailable data is requested using the standard RAID algorithm and the unavailable data block is repaired by writing the regenerated data. In the present invention, before regeneration occurs, the log is interrogated and if a log entry contains the LBN for one of the data blocks needed for regeneration, then regeneration is prevented because the parity block associated with that LBN has not yet been written and any regeneration of the data would result in corrupt data. In addition, if a system failure occurs during a data write or after the data write but before the associated parity block is written, the original data can be accurately reconstructed using the remaining data blocks and the original parity information that remains in the parity block.

BRIEF DESCRIPTION OF THE DRAWINGS

Other advantages of the invention will become apparent upon reading the following detailed description and upon reference to the accompanying drawings, in which.

While the invention is susceptible to various modifications and alternative forms, specific embodiments thereof have been shown by way of example in the drawings and will herein be described in detail. It should be understood, however, that the invention is not intended to be limited to the particular forms disclosed. On the contrary, the applicant's intention is to cover all modifications, equivalents, and alternatives falling within the spirit and scope of the invention as defined by the appended claims.

DETAILED DESCRIPTION OF THE PREFERRED EMBODIMENTS

The present invention is a method and apparatus for performing write operations to a data storage system having a plurality of disks that store data according to a RAID organization. Different RAID organizational structures, which are referred to as levels, are known to those of ordinary skill in the field. The difference between levels is principally the methodology used to store parity data. For example, some RAID levels store parity information on each disk in the RAID array, while a separate disk is dedicated entirely to the storage of parity information in other levels. Although the present invention is applicable to RAID organizations in which parity information is stored on a single disk, a preferred embodiment of the present invention is used in conjunction with RAID levels in which some parity data is stored on each disk of the RAID array.

The invention preserves data integrity when simultaneous data write operations are performed on unrelated LBNs that map to the same parity block. This aspect of the invention is particularly useful in systems that allow multiple CPUs to access the same RAID array because the invention eliminates synchronization of write operations among the multiple CPUs. The regeneration of undetected corrupt data resulting from the write hole problem is also eliminated by the invention. The method of the present invention requires only two I/O cycles to perform a write operation and requires no extra synchronization. System write performance is improved by the method and apparatus of the present invention because system overhead needed to prevent simultaneous updating of parity blocks mapped to the same LBN is not needed. Furthermore, the invention permits an entire steady state write operation to consist of exactly two serialized write operations. Thus, write performance of RAID systems is improved by the present invention, making RAID more competitive with other storage techniques.

Figure 1A:
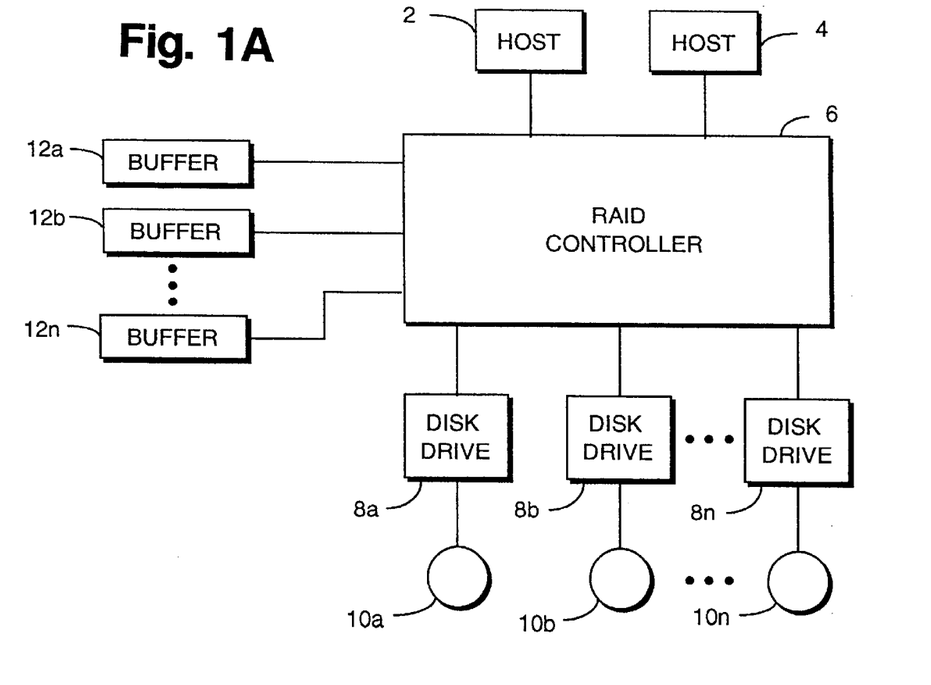
FIG. 1A and FIG 1B are block diagrams representing RAID systems embodying the present invention.

Referring to the drawings, FIG. 1A is a block diagram showing one embodiment of a RAID data storage system organized according to the present invention. Host computers 2, 4 are connected to a RAID controller 6, which controls the operation of a plurality of disk drives 8a through 8n and corresponding disks 10a through 10n that are configured as a RAID array. RAID controllers are well-known in the field and, accordingly, further description is not necessary. A typical RAID controller may be implemented in hardware and/or software. Accordingly, the present invention can be implemented in either hardware or software.

Figure 1B:
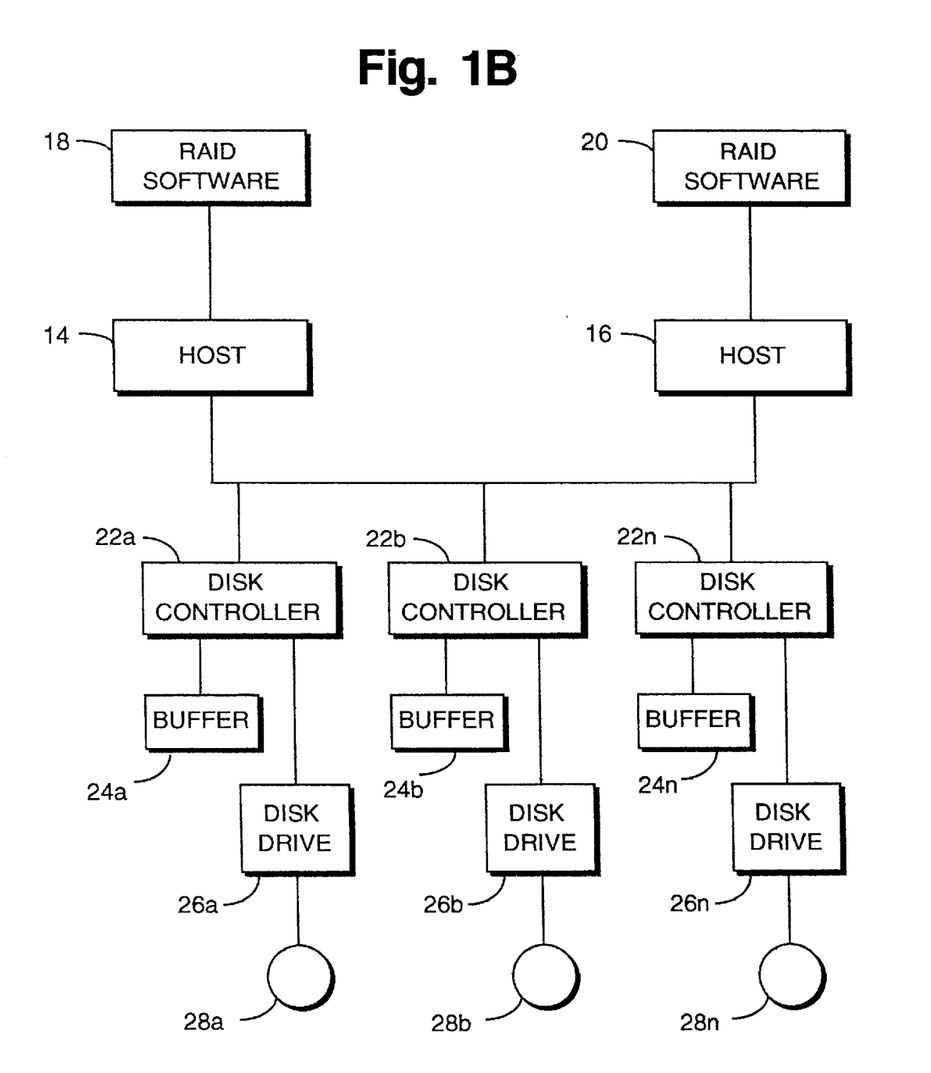

In software implementations of the invention, the software may reside in the RAID controller or in the memory of the host computer (See FIG 1B). The preferred embodiment of the present invention is a software implementation in which the software resides in the host computer. As will be appreciated by those of ordinary skill in the field, the number of disks in a RAID array is variable.

The present invention stores metadata in a log. As will be fully described below, the metadata provides a list of data blocks that must be updated and, accordingly, the corresponding parity blocks that must be updated to provide consistency between the data blocks and parity. In the embodiment shown in FIG. 1A, the log containing the metadata is configured as a plurality of separate ring buffers 12a through 12n, corresponding to disk drives 8a through 8n, respectively. The ring buffers are preferably maintained in non-volatile memory in the RAID controller 6. Each of the ring buffers 12a through 12n preferably contains the metadata for one of the disks in the RAID array. The structure and operation of ring buffers are well-known in the field.

In an alternative embodiment, the ring buffers 12a through 12n may be maintained on one or more of the disks of the RAID array itself. In an embodiment of the invention in which the log entries are stored on disks in the RAID array, the log for each disk is preferably stored on the disk that stores the corresponding parity block. Whether the ring buffers 12a through 12n are configured in memory in the RAID controller 6 or stored on disks in the RAID array, they provide non-volatile storage of information in the event of a system failure.

The metadata stored in the log is a listing of LBNs to which data must be written to complete the write operation. Although a single log entry for each data write is sufficient to practice the invention, log entries are preferably duplicated in embodiments of the invention in which the log is stored on a disk in the RAID array to minimize the possibility that an entry will be rendered unusable for any reason.

When a write operation is requested by an application program running on the host computer, the RAID controller 6 makes a separate log entry for the LBNs that require a separate parity block to be updated to complete the write operation. In other words, separate log entries are made if the write operation affects data blocks having their associated parity information stored in separate parity blocks. As will be fully described below, log entries are not removed until the corresponding data and parity writes have both occurred. The application requesting the data write cannot remove entries from the log.

FIG. 1B shows an alternative embodiment of a computer system embodying the present invention. Host computers, 14, 16 are configured with RAID software 18, 20 according to the present invention. A plurality of disk controllers 22a–22n are connected to each of the host computers 14, 16. Each of the disk controllers 22a–22n is associated with a buffer 24a–24n and a disk drive 26a–26n. Each of the disk drives 26a–26n is associated with a disk drive 28a–28n.

Figure 2:
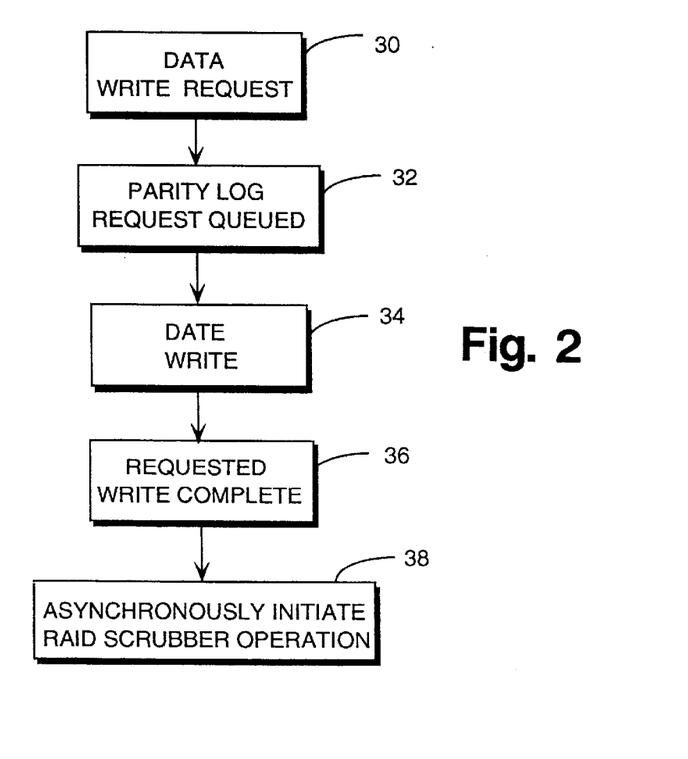
FIG. 2 is a flow chart showing a write cycle in a RAID configuration of disks.

FIG. 2 is a flow chart showing a complete write cycle according to the present invention. A write operation is initiated by an application program at step 30. A typical write request is generated by an application program running on one of the host computers 2, 4 (FIG. 1). The request is received by the RAID controller 6. As will be appreciated by those of ordinary skill in the field, the RAID controller 6 determines the identities of the specific LBNs to be employed in storing the new data. At step 32, a log update request is queued into the log for the proper disk in the RAID array. As previously noted, the log entry includes information identifying each data block affected by the requested write operation. Each requested write operation that is determined to affect a separate parity block has a separate entry in the log. In other words, each log entry is a self-describing list of LBNs that corresponds to a single parity block to update.

The data is written to the RAID array in step 34. When the log entry has been made and the data write has been accomplished, the requested data write operation is completed, as indicated at step 36. As shown at step 38, a RAID scrubber operation is subsequently started asynchronously to calculate parity for the blocks affected by the write request. The scrubber operation is fully described below.

To perform the panty updates based on the contents of the log, the RAID controller 6 or host configured with RAID software implements a RAID scrubber operation, which periodically scours all disks in the RAID array and generates correct parity blocks. In a preferred embodiment of the invention, the scrubber operation is implemented as a background process. Pending log entries are retrieved by the scrubber operation from the log and the parity calculation and update are performed. The scrubber operation removes the log entry from the log only after the parity block has been written. Thus, for reconstruction operations resulting from system failure, surviving log entries correspond to write operations that were not successfully completed. The parity for the LBNs identified in the surviving log entries will not correspond with the associated data blocks.

An advantage of the RAID methodology is that it allows access to all data in the RAID array even if one of the component disks fails. In the event of such a failure, data on the failed disk is reconstructed by reversing the process for creating parity information. It should be noted that many methods of generating parity are well-known in the art. A typical mode of computing parity in RAID systems is to compute the XOR of corresponding bits in a plurality of data blocks and to store the result as the parity block for those data blocks. As previously noted, this method of parity generation allows data in any one of the plurality of data blocks used to calculate the parity to be recreated in the event that data is not available. The specific method of parity generation is not an essential feature of the present invention.

Conversely, data and parity from the surviving disks is exclusive-ORed ("XORed") to compute the unavailable data. This process is fully described below, with reference to FIG. 4. As will be appreciated by those of ordinary skill in the art, the missing or unavailable data can be determined based on this regeneration because the missing data was originally employed to calculate the parity.

Figure 3:
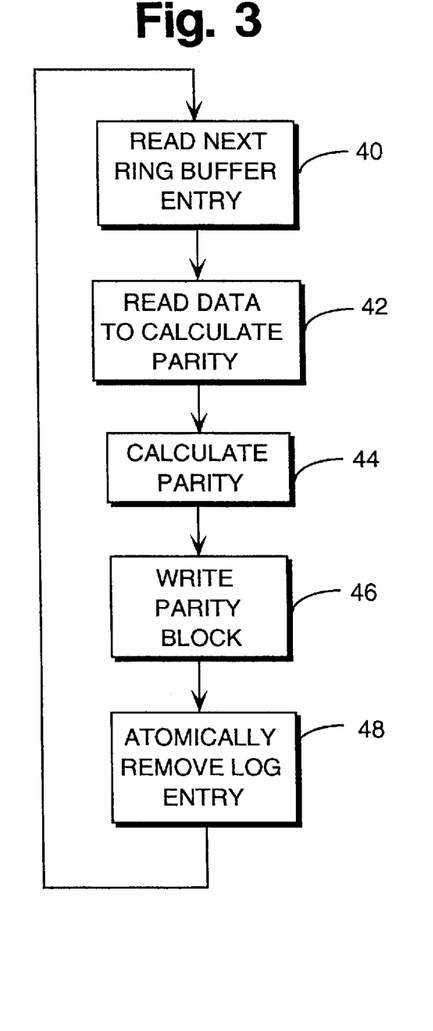
FIG. 3 is a flow chart showing the RAID scrubber operation of the present invention.

FIG. 3 is a flow chart showing the RAID scrubber operation of the present invention. As can be seen from FIG. 3, the scrubber operation proceeds in a continuous loop as long as there is data in any log ring buffer. At step 40, the scrubber operation reads the next available log entry. At step 42, the scrubber operation initiates the reading of all data blocks that correspond to the parity block represented by the log entry read in step 40. At step 44, the parity block is calculated based upon the data read in step 42.

After the parity block is generated, it is written onto the appropriate disk in the RAID array at step 46. Finally, at step 48, the scrubber operation atomically removes the corresponding entry from the ring buffer and loops back to the next available ring buffer entry at step 40. Thus, the method of the present invention solves the write hole problem because ring buffer entries are not deleted until both the data write and the parity write operations have been completed.

As will be appreciated by those of ordinary skill in the field, the write hole phenomenon can occur in the event that either the data write or the parity write is not completed. However, a write hole cannot occur if both write operations are completed or if neither operation is complete. This is true because inconsistency between data blocks and the parity block occurs when the data blocks in fact contain different information than represented in the parity block. If a subsequent failure of a disk occurs or if a particular data block is unreadable for any reason, the unavailable data cannot be accurately regenerated because of the inconsistency caused by the prior write operation failure.

In a system operating according to the present invention, the deletion of a log entry by the scrubber operation ensures that the parity block affected accurately corresponds to the associated data. Because each log entry corresponds to one parity block, the log effectively represents a list of parity blocks that were not updated after having data written to LBNs represented by the parity block. Data regeneration upon disk failure is accomplished by interrogating all log entries to identify parity blocks that do not contain accurate information about the corresponding data blocks. Parity blocks corresponding to entries in the log are not used to reconstruct lost data. In this event, an error message is generated when reconstruction of this data is attempted. Thus, corrupt data is never regenerated.

Figure 4:
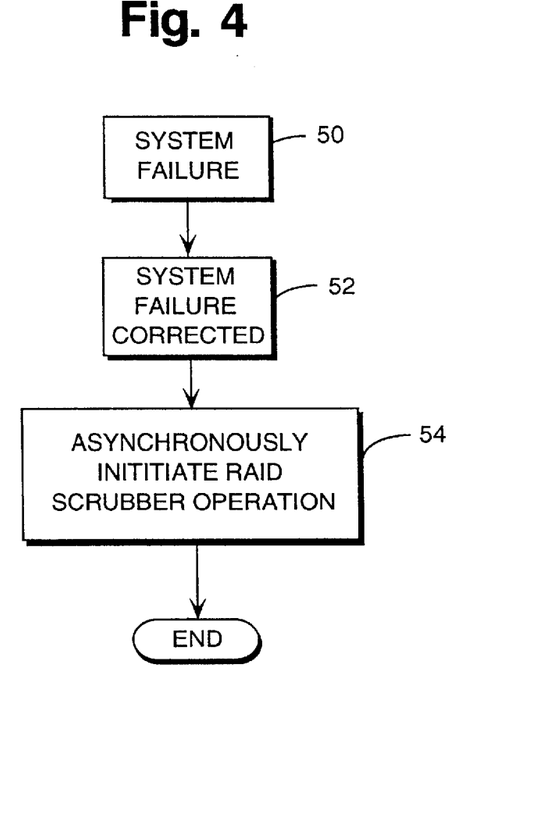
FIG. 4 is a flow chart showing the steps employed after a system failure by a RAID system embodying the present invention.

FIG. 4 is a flow chart showing the steps employed after a system failure by a RAID system embodying the present invention to assure that corrupt data is not generated. A system failure occurs at step 50 and is corrected at step 52. After the system is restored, the status of read/write operations when the system failure occurred is not determinable without the present invention. In other words, there would be no way to determine which data blocks were in the process of being written or which parity blocks had been updated when the system failure occurred. The probability of having some data corruption is high because of this uncertainty.

The present invention overcomes the inability to determine the identity of data blocks that have inconsistent parity blocks. At step 54, the RAID scrubber operation is asynchronously initiated, as previously described with reference to FIG. 3. The scrubber operation interrogates the surviving log entries at the time the system failure occurred to determine the identity of the LBNs having pending parity updates. The log entry is deleted after the parity update has been performed.

Figure 5:
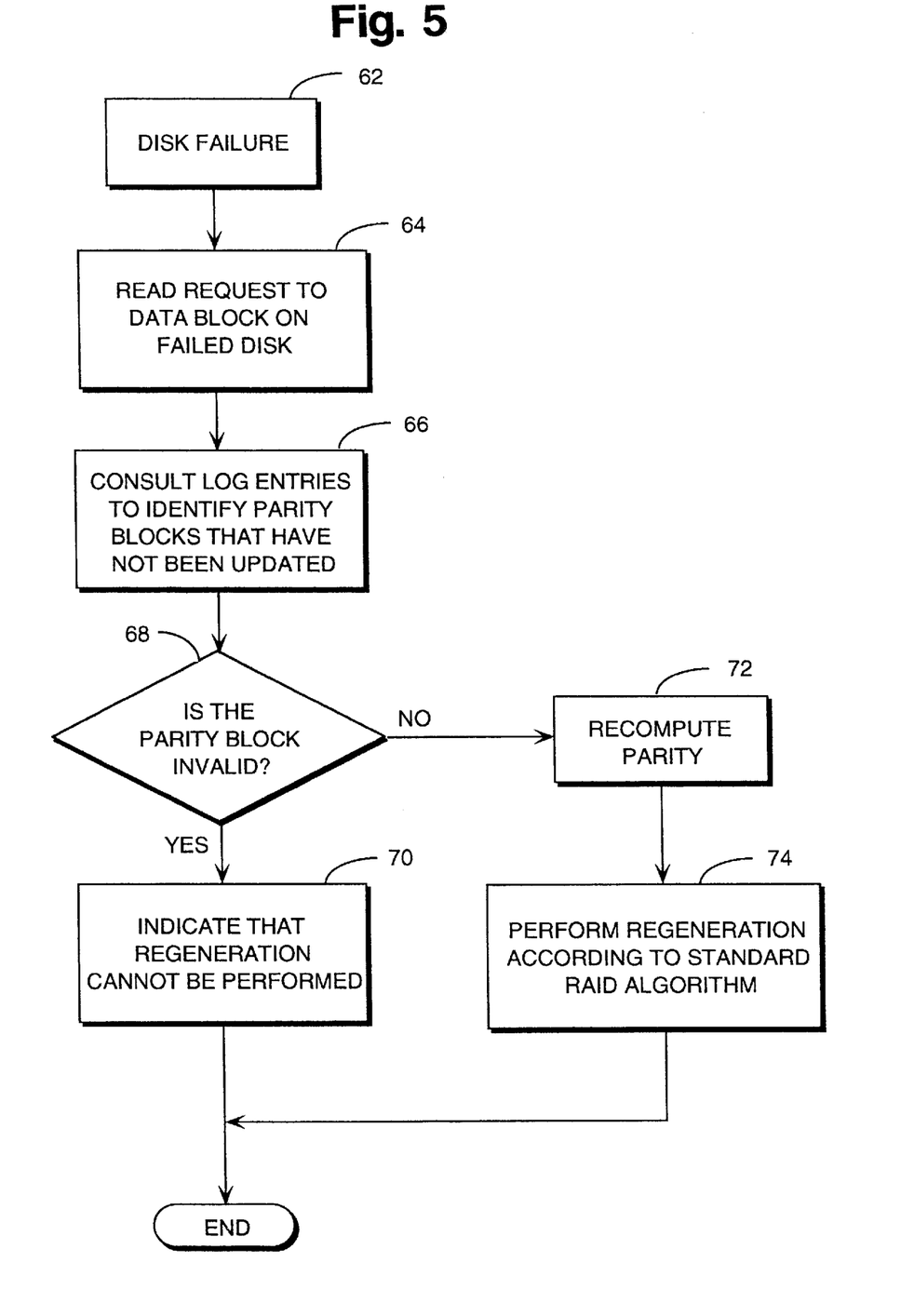
FIG. 5 is a flow chart showing the steps employed after a disk failure by a RAID system embodying the present invention.

FIG. 5 is a flow chart showing the steps employed after a disk failure by a RAID system embodying the present invention to ensure that data corruption does not occur when data is regenerated. At step 62, a failure of one disk in the RAID array occurs.

As will be appreciated by those of ordinary skill in the field, data is regenerated when a read operation calls for data that is stored on a disk that is no longer available. A subsequent read requests initiates a regeneration at step 64. In prior art RAID systems, corrupt data would be regenerated for data blocks that had to be reconstructed using a parity block that had not been updated since new data had been written to any of the data blocks associated with that parity block. The present invention overcomes this problem by using the logs containing pending parity updates.

At step 66, the log entries are consulted during data regeneration to identify parity blocks that have not been updated since data was written to one of the corresponding data blocks. The need to consult log entries to regenerate data is an important reason for storing the log entries in non-volatile memory in the RAID controller 6 or host computer, rather than on one of the disks in the RAID array. If the log entries are stored on the disks of the RAID array only, the entries stored on the failed disk could not be used for data regeneration.

At step 68, the RAID controller determines whether the parity block corresponding to each log entry is invalid. This can easily be determined by the controller from the LBN mapping information, which relates LBNs to specific disks in the RAID array. If the corresponding parity block is stored on the failed disk, regeneration cannot take place for any data block that shares the same parity block as the log entry because the parity block cannot be recovered from the failed disk. Accordingly, such invalid parity blocks cannot be used for regeneration, as shown in step 70.

If the parity block needed for regeneration is valid (i.e., stored on a disk other than the failed disk), parity must be recomputed, as shown in step 72. After the parity has been recomputed, data regeneration proceeds according to the standard RAID algorithm at step 74. As will be appreciated by those of ordinary skill in the field, the present invention minimizes the amount of data that cannot be used for regeneration purposes and identifies data blocks that cannot be regenerated to prevent corrupt data from being unknowingly regenerated.

Notably, the inconsistency between data and parity prevents the RAID algorithm from recreating data if the corresponding parity block is stored on a component disk that is not functional. Because the regeneration of data depends on the parity block, LBNs corresponding to a log entry whose parity is stored on the failed disk cannot be used to generate lost data. Thus, the present invention prevents the use of corrupt data resulting from a write hole failure.

Additionally, the problem of corruption resulting from simultaneous data write operations to unrelated LBNs that map to the same parity block is overcome. With the method and apparatus of the present invention, a parity block can never be corrupted by simultaneous data write operations because each write request that maps to a specific parity block is recorded in a separate log entry. This property of the invention is particularly useful in systems where data access by multiple CPUs is permitted. The correct parity for both write operations is guaranteed after both log entries have been processed. It will be appreciated by those of ordinary skill in the art that parity will be correct after processing one of the multiple log entries if both data write operations have already been completed when the first of the two log entries is processed by the scrubber operation. In this event, the processing of the second log entry is tautological because the LBNs that correspond to the specific parity block have already been updated with data corresponding to the second log entry. In other words, if data write operations for both entries corresponding to a given parity block have occurred, parity will be correct after processing only one log entry because the constituent data in the corresponding LBNs has already been updated. Accordingly, system overhead required to prevent simultaneous write operations to parity blocks is eliminated by the present invention.

Thus, there has been described herein a method for writing information to disk in a RAID array. It will be understood that various changes in the details, arrangements and configurations of the parts and system which have been described and illustrated above in order to explain the nature of the present invention may be made by those of ordinary skill in the art without departing from the principle and scope of the present invention as expressed in the appended claims.

What is claimed is:

1. A method of regenerating data following a disk failure in a RAID array of a data storage system resulting in a failed disk and a plurality of surviving disks, said RAID array storing information comprising a plurality of data blocks and a parity block for containing parity information corresponding to said plurality of data blocks, said data storage system storing in a log information relating to pending parity block updates, said method comprising the steps of:

interrogating said log to determine if said parity block needed for regeneration has not been updated;

determining whether said parity block is stored on said failed disk;

recomputing said parity information in said parity block to correspond with data currently stored on said surviving disks if said parity block needed is not stored on said failed disk and has not been undated;

recovering data stored on said failed disk using said recomputed parity information and said data stored on said surviving disk; and generating an error message indicating that regenerating cannot be performed if said parity block is stored on said failed disk.

2. The method of claim 1 wherein said log entry comprises a list of logical block numbers to be written to complete said requested update.

3. The method of claim 1 wherein said log entry is stored in a ring buffer.

4. The method of claim 3 wherein said ring buffer is stored in non-volatile memory in a RAID controller.

5. The method of claim 3 wherein said ring buffer is stored in non-volatile memory in a host computer.

6. The method of claim 3 wherein said ring buffer is stored on said RAID array.

7. A method of updating information stored on disks of a RAID array, said method comprising:

storing logical block numbers as entries in a log, the logical block numbers corresponding to data blocks to be updated, each entry mapping to a single parity block;

writing said data blocks with new data;

reading said logical block numbers for said each entry;

reading said data blocks corresponding to said read logical block numbers;

calculating new parity information corresponding to said read data blocks;

updating said parity block with said new parity information; and removing said entry from said log when said updating has been completed.

8. An apparatus for updating information stored on an array of disks in a disk drive system comprising:

means for storing logical block numbers as entries in a log, the logical block numbers corresponding to data blocks to be updated, each entry mapping to a single parity block;

means for writing said data blocks with new data;

means for reading said logical block numbers for said each entry;

means for reading said data blocks corresponding to said read logical block numbers;

means for calculating new parity information corresponding to said read data blocks;

means for updating said parity block with said new parity information; and means for removing said entry from said log when said updating has been completed.

9. The apparatus of claim 8 wherein said log entry is stored in a ring buffer.

10. The apparatus of claim 9 wherein said ring buffer is stored in nonvolatile memory in a RAID controller.

11. The apparatus of claim 9 wherein said ring buffer is stored in nonvolatile memory in a host computer.

12. The apparatus of claim 9 wherein said ring buffer is stored on said disk drive system.

* * * * *